(12) United States Patent
Hanten

(10) Patent No.: US 8,839,595 B2
(45) Date of Patent: Sep. 23, 2014

(54) FILLING DEVICE AND METHOD FOR FILLING WITH VISCOUS FILLING MATERIAL

(75) Inventor: Jürgen Hanten, Bad Nauheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 953 days.

(21) Appl. No.: 11/931,314

(22) Filed: Oct. 31, 2007

(65) Prior Publication Data

US 2008/0264515 A1    Oct. 30, 2008

(30) Foreign Application Priority Data

Nov. 3, 2006   (DE) .......................... 10 2006 052 023

(51) Int. Cl.
*B65B 51/00*   (2006.01)

(52) U.S. Cl.
USPC ................................. 53/417; 53/452; 53/550

(58) Field of Classification Search
USPC .......... 53/417, 450, 452, 550, 138.2, 558, 64, 53/66; 452/22, 30
See application file for complete search history.

(56) References Cited

U.S. PATENT DOCUMENTS

| | | | | |
|---|---|---|---|---|
| 2,607,696 A | * | 8/1952 | Kunz | 426/413 |
| 2,686,725 A | * | 8/1954 | Cornwell | 138/118.1 |
| 2,999,270 A | * | 9/1961 | Knapp | 452/31 |
| 3,526,079 A | * | 9/1970 | Maxeiner | 53/551 |
| 3,601,845 A | * | 8/1971 | Mavrich | 452/43 |
| 3,889,446 A | * | 6/1975 | Simmons et al. | 53/451 |
| 3,916,598 A | * | 11/1975 | Adams et al. | 53/55 |
| 4,017,941 A | | 4/1977 | Raudys et al. | |
| 4,257,146 A | * | 3/1981 | Karp | 452/31 |
| 4,451,954 A | | 6/1984 | Muller et al. | |
| 4,479,283 A | * | 10/1984 | Hollingsworth | 452/22 |
| 4,563,792 A | * | 1/1986 | Niedecker | 452/31 |
| 4,580,316 A | * | 4/1986 | Gunter | 452/22 |
| 4,724,657 A | | 2/1988 | Roovers et al. | |
| 4,754,593 A | | 7/1988 | Ishihara et al. | |
| 4,809,485 A | | 3/1989 | Nielsen | |
| 5,158,498 A | * | 10/1992 | Frey | 452/44 |
| 5,241,800 A | | 9/1993 | Steinke et al. | |
| 6,029,428 A | | 2/2000 | Terminella et al. | |
| 6,056,634 A | * | 5/2000 | Schwarz et al. | 452/27 |
| 6,066,035 A | * | 5/2000 | Hergott et al. | 452/31 |

(Continued)

OTHER PUBLICATIONS

EP 07 020 847.5 Search Report.

*Primary Examiner* — Sameh H. Tawfik
(74) *Attorney, Agent, or Firm* — Hahn Loeser & Parks LLP

(57) ABSTRACT

A filling device and associated method for filling viscous filling material, in particular sealants, into a tubular casing material. The filling device comprises: a shutoff valve, a filling tube disposed downstream from the shutoff valve in the direction of flow of the filling material, a clip placement and clip closing device disposed downstream from the filling tube in the direction of flow of the filling material and a supply of tubular casing material disposed at least partially on the filling tube. At least one sensor is also provided for directly or indirectly measuring the length of casing material drawn from the supply of casing material, the output signal of the sensor being able to control at least the closing of the shutoff valve through which the pressurized filling material can be fed to the filling tube.

21 Claims, 3 Drawing Sheets

(56) References Cited

U.S. PATENT DOCUMENTS

| | | | |
|---|---|---|---|
| 6,146,261 A * | 11/2000 | Bienert et al. | 452/32 |
| 7,021,028 B2 * | 4/2006 | Hanten | 53/450 |
| 7,244,171 B2 * | 7/2007 | Muller et al. | 452/33 |
| 2003/0073397 A1 * | 4/2003 | Stanley et al. | 452/35 |
| 2006/0000188 A1 * | 1/2006 | Nikoley et al. | 53/64 |

* cited by examiner

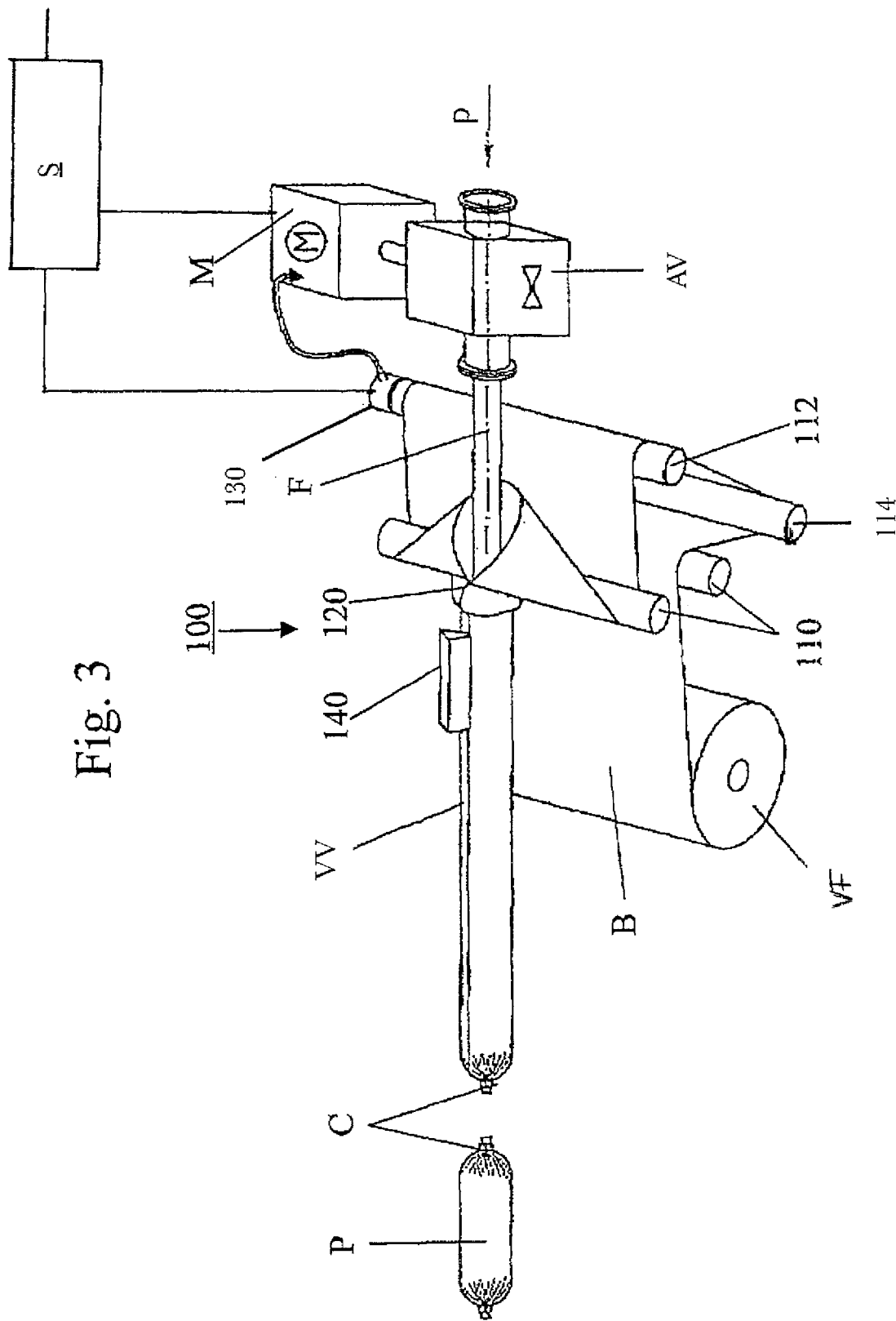

FILLING DEVICE AND METHOD FOR FILLING WITH VISCOUS FILLING MATERIAL

BACKGROUND AND SUMMARY OF THE INVENTION

The invention relates to a filling device for filling viscous filling material, in particular sealants, into a tubular casing material, and to a method therefor.

More particularly, the invention relates to a filling device for filling viscous filling material, such as sealants, especially silicone, or sausage meat, into a tubular casing material, wherein the device comprises: a shutoff valve, a filling tube disposed downstream from the shutoff valve in the direction of flow of the filling material, a clip placement and clip closing device disposed downstream from the filling tube in the direction of flow of the filling material and a supply of tubular casing material disposed at least partially on the filling tube. The invention further relates to a method for filling viscous filling material, such as sealants, especially silicone, or sausage meat, etc., into a tubular casing material, wherein the method comprises the following steps: feeding pressurized, viscous filling material to a shutoff valve, filling the filling material through a filling tube into a tubular casing material and drawing a further portion of tubular casing material from the supply of tubular casing material.

Filling systems are known in practice which transport viscous filling material under pressure into a metering device in order to fill it in portions or discontinuously into the respective packaging in an actual filling device. Such a known filling system, shown in FIG. 1, consists of a barrel press FP arranged on the right in the drawing in FIG. 1 and a piston metering machine KD located downstream from the barrel press FP, to the left thereof in the direction of flow of the filling material. The piston metering machine has a generally vertical metering piston and a three-way valve which is not shown in any detail. The input to the three-way valve is indicated by the horizontal first connecting pipe R coming from the right, which connects the barrel press FP to the piston metering machine KD. A first output of the three-way valve points perpendicularly upwards into the metering piston of the piston metering machine KD, and a second output of the three-way valve points horizontally to the left.

A known sealing/clipping machine SC, in which the filling material is packed in portions, is arranged downstream from the piston metering machine KD, to the left thereof in the direction of flow of the filling material. The filling material is fed to the sealing/clipping machine SC through a second connecting pipe R which is flanged to the second output of the three-way valve and leads in the direction of flow of the filling material to the front end of a filling tube F which extends into the sealing/clipping machine SC.

In this known system, the filling material located in the barrel press is firstly pressurized such that it is transported through the first connecting pipe R to the piston metering machine KD. When the three-way-valve disposed at the input to the piston metering machine KD is in the 'Load' position, the filling material is transported through the input of the three-way valve to its first output pointing perpendicularly upwards, thus arriving in the metering piston of the piston metering machine KD. The three-way valve is then moved to the 'Fill' position, in which the input of the three-way valve is closed while the first output leading to the input for the filling material in the metering piston and the second output of the three-way valve is opened. The piston metering machine KD now presses the filling material in the metering piston through the first and the second output of the three-way valve via the second connecting pipe R and the filling tube F into the sealing/clipping machine SC, where it is filled into a tubular casing and packaged into portions by placing and closing clips. A transport device T then carries the packaged products out of the sealing/clipping machine SC for further processing. After the filling material has been transported out of the piston metering machine through the second connecting pipe R into the sealing/clipping machine SC, the three-way valve is returned to the 'Load' position and the operation described in the foregoing starts from the beginning again.

The filling systems used until now for viscous filling material and explained with the above example are of complicated construction, which involves a considerable amount of care and maintenance, especially in the food industry. More specifically, only discontinuous operation is possible with the known filling device, due to the loading time of the piston metering machine, which leads to a long production time for the filled product being made.

The aim of the present invention is to overcome these disadvantages. In particular, an object of the invention is to provide a filling device and a filling method of the kind initially specified, which permits a continuous production process for the filling material product. Another object of the invention is to provide a device and a method such that a reduction in care and maintenance work with a simplified construction is permitted.

By providing at least one sensor, preferably a continuously measuring sensor, for directly or indirectly measuring the length of casing material drawn from the supply of casing material, an output signal of the sensor controlling at least the closing of a shutoff valve through which the pressurized filling material is fed to the filling tube, it is advantageously possible to dispense with the piston metering machine and the three-way valve of the known filling device, so that an at least approximately continuous production process is made possible for the filling material product. The construction of the filling device according to the invention is also simplified in comparison with the known device, such that the care and maintenance work involved is reduced. With the proposed invention it is also possible to adjust the volume of the filling material product easily, since the time at which the valve opens or closes, or the duration that the valve is open can be controlled or regulated.

In one advantageous embodiment, a controller is provided by means of which it is possible to adjust at least the length of time that the shutoff valve is open. In this way, it is possible with the filling device according to the invention to fix the amount of material that is filled when the diameter of the shutoff valve and the flow speed of the filling material are known.

It is also advantageous if the controller is connected to the sensor in order to process the sensor signals. The controller enables the use of different suitable sensors, depending on the measuring location, by adapting the controller accordingly to the respective sensor in use. In particular, the sensor may be a continuously measuring sensor. The sensor may be embodied by a rotary transducer, for example.

In addition to the function, described above, of setting the duration of time that the shutoff valve is open, the controller can control or regulate additional functions and receive and supply additional signals for this purpose. It is also advantageous if, for example, the controller or the clip placement and clip closing device is able to output a start signal for a filling operation, in order to start the filling process. To achieve optimal coordination between the feeding of filling material by the shutoff valve and finishing the filling operation, it can be advantageous for the controller to be connected to the clip placement and clip closing device.

After a filled product has been severed from the remaining supply of casing material, the filled product can be carried out of the clipping machine by an appropriate transport device for further processing. For this purpose, the clip placement and clip closing device includes a severing unit for severing a filled product after completion of the filling operation.

If the controller is able to output a start signal for a filling operation after receiving a clip placement and clip closing signal and/or a severed signal from the clip placement and clip closing device, it is possible to coordinate the termination of the filling operation and the start of the next filling operation.

It is essentially possible to produce the supply of casing material in advance and to pull it at least partly onto the filling tube before the filling operation begins. It is then advantageous if the sensor for measuring the length of casing material drawn from the supply of casing material is disposed in the immediate vicinity of the filling tube, because this makes it possible to measure the length of casing material drawn from the supply in a particularly precise and direct manner. The sensor for measuring the length drawn from the supply of tubular casing material can be disposed in the immediate vicinity of the supply of casing material and can be embodied, for example, by a length measuring sensor fitted with a track roller.

It is likewise possible for the tubular casing material to be produced during the filling operation. It is advantageous in this context if there is provided a supply of flat web material for the casing material, and a sealing device which wraps the flat web material drawn from the supply of flat web material around the filling tube to form a tube and which seals the tube in the longitudinal direction. By this means, and with a suitably large supply of flat web material, any desired quantity of filled products can be produced without interruption. In this embodiment, there is also no necessity to remove the filling tube in order to replenish the supply of casing material.

In the embodiment of the invention just described, it is advantageous if the sensor for measuring the length of casing material drawn from the supply of casing material is disposed on a deflecting roller in the sealing device and measures the length of the flat web material drawn from the supply thereof. If the sensor is a rotary transducer, for example, the length of flat web material drawn off can be determined directly from the rotation of the deflecting roller, and hence the length of the casing material drawn from the supply of casing material can be determined indirectly. In addition, the sensor is not impaired when the supply of flat web material is being replenished.

It is also advantageous if the casing material is drawn by means of the pressurized filling material from the supply of casing material disposed on the filling tube. This avoids the need for an additional drive or a pull-off device. Such a drive or such a device requires additional machinery parts and their control.

In order to build up this pressure, it is also advantageous if a pressurizing device is connected to the shutoff valve. The level of pressure is chosen in such a way that no additional transport device for the filling material is necessary in the entire filling device according to the invention.

Depending on the embodiment, the shutoff valve can be actuated in different ways. In one preferred embodiment, it can be driven by a motor. Such a motor can be controlled in a particularly simple manner by an appropriate sensor signal. More improved control is possible if the motor of the shutoff valve is connected to the controller. By this means, it is possible to adapt the sensor signal to the motor being used.

It must also be noted that the device according to the invention and the method according to the invention can be used to fill many different kinds of fluid and viscous materials. In addition to sealants, these materials can also be silicone, polyurethane, acrylates, etc., and also sausage meat.

Other advantageous configurations and an embodiment of the invention shall now be described with reference to the attached drawings. The terms 'top', 'bottom' 'left' and 'right' used when describing the embodiment relate to the drawings oriented in such a way that the reference numerals and names of the figures can be read normally.

BRIEF DESCRIPTION OF THE DRAWING FIGURES

FIG. 3 shows a filling device according to the present invention.

DETAILED DESCRIPTION

Figure 1:
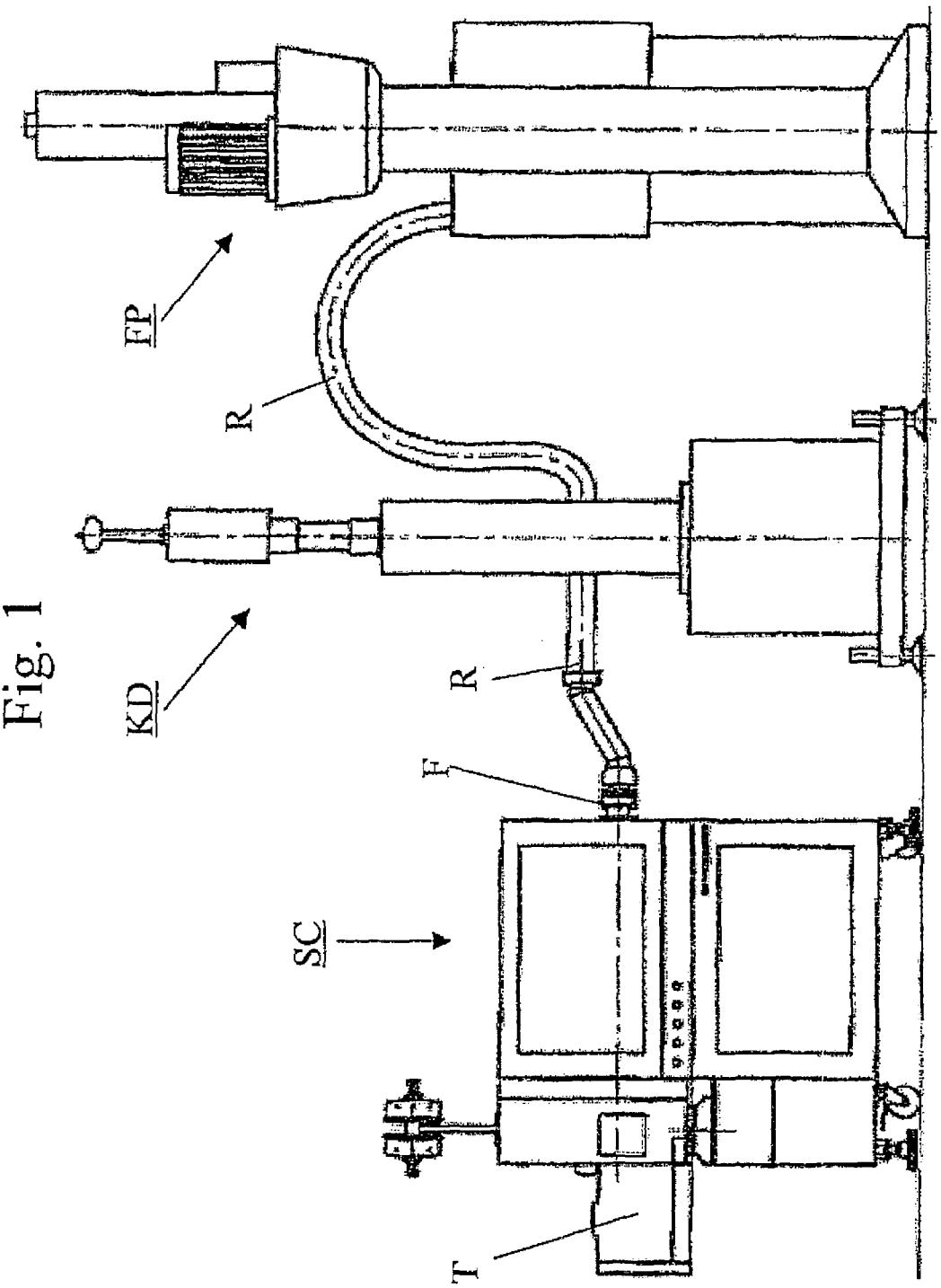
FIG. 1 shows a schematic view of the basic structure of a prior art filling plant.
Figure 2:
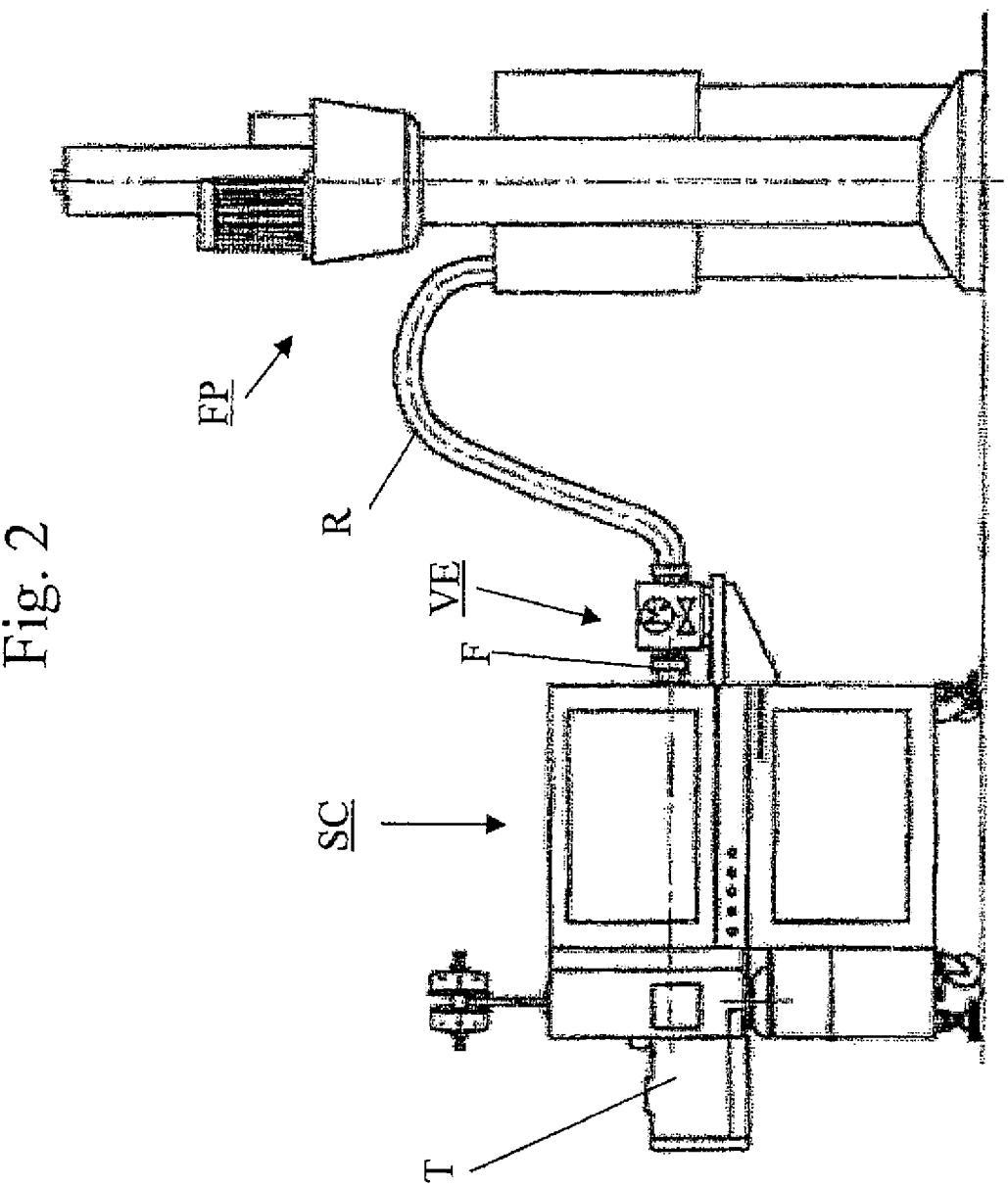
FIG. 2 shows a schematic side view of the basic structure of a filling plant for viscous filling material, in which the present invention is used.

FIG. 2 shows the basic structure of a filling plant, for viscous filling material such as sealants or sausage meat, in which the filling device according to the invention is used. The filling plant comprises a known barrel press FP which is used to apply a pressure to material being conveyed. In the direction of flow of the filling material, i.e., to the left in the drawing in FIG. 2, barrel press FP is followed by valve unit VE. The connection between barrel press FP and valve unit VE is formed by a connecting hose or connecting pipe R, the latter normally consisting of a non-rusting stainless steel.

As can be seen from FIG. 3, valve unit VE comprises a shutoff valve AV and a motor M for actuating shutoff valve AV. Motor M is connected to a controller S by a signal line which is not described in any further detail, and the motor can receive control signals from the controller or send signals to it, if necessary.

Shutoff valve AV is embodied as a straight-way valve, the through opening of which runs horizontally and from right to left, which also characterizes the direction of passage filling material through the valve. When used in the food industry, such a valve is likewise made of rustproof stainless steel.

As can also be seen from FIG. 3, shutoff valve AV is followed in the direction of flow of the filling material by a filling tube F, which extends into a sealing/clipping machine SC connected thereto. Filling tube F is aligned horizontally and coaxially with the through opening of the shutoff valve AV mentioned above, thus forming an extension of the through opening of the shutoff valve AV from which the filling material cannot leak. Sealing/clipping machine SC is connected in the direction of flow of the filling material to a transport device T, which transports the filled product P out of sealing/clipping machine SC (cf. FIG. 2).

A tubular section, not described in any further detail and made of a casing material, is disposed on filling tube F, forming a supply VV of the casing material. As can be seen from FIG. 3, the left-hand end of the supply of casing material is sealed with a clip C such that no filling material can escape.

Sealing/clipping machine SC includes a sealing unit 100 and a clip placement and clip closing device, not shown. One or both of these can likewise be connected to the controller S so that the latter can control the devices. As FIG. 3 shows, sealing device 100 contains a supply VF of known flat web material B capable of being sealed, which is rolled up in a roll. This roll is disposed transversely to the direction of flow of the filling material under filling tube F in at least an approximately horizontal orientation. Flat web material B is rolled off the roller and guided over a plurality of deflecting rollers 110, 112, 114 with axes parallel to that of the roller and likewise disposed under filling tube F, in order to smooth the material and maintain the tension in the web. To avoid damage to flat web material B, the deflecting rollers 110, 112, 114 can consist of a plastic.

A sensor 130 is arranged at the rear end of deflecting roller 112 in the drawing, the signal from the sensor being used to measure the length of flat web material B drawn from the supply VF thereof. The signal from sensor 130 is forwarded via a signal line to the controller S, which is able to process and/or use this signal in the manner to be described below.

A shaper ring 120 is arranged coaxially to the filling tube, approximately in the middle thereof. It is used to form the tubular portion of casing material, as shall likewise be described in greater detail below.

After being drawn from the supply VF and after subsequently passing deflecting rollers 110, 112, 114 in the direction of flow of the filling material, the flat web material B is guided through shaper ring 120, where it is wrapped around filler tube F to form a tube. The width of flat web material B is selected so that the longitudinal edges of flat web material B overlap by a desired width. The overlap runs on the upper edge of filling tube F. Sealing bar 140 is vertically disposed over filling tube F and immediately after shaper ring 120 in the direction of flow of the filling material. It is located over the overlap of flat web material B wrapped to form the tube, in order to seal the overlap tight for the filling material by means of hot sealing or hot-air ultrasound, high frequency, etc. At the left end of filling tube F, facing away from shutoff valve AV, the clip placement and clip closing device (not shown) for placing and closing clips C is disposed.

Viscous filling material is filled as follows into the tubular casing material using the device according to the invention:

The filling material to be packaged, for example sausage meat or sealing compound, is located in barrel press FP. Barrel press FP applies such a pressure to the filling material that the material is transported through connecting pipe R to shutoff valve AV, which is initially closed. If the motor M of shutoff valve AV receives a start signal for a filling operation from controller S, it opens shutoff valve AV and the filling material flows through shutoff valve AV into filling tube F. The tube section forming the supply VV of tubular casing material is located on filling tube F at the front end thereof and is closed by clip C immediately after the end of filling tube F in the direction of flow of the filling material, thus forming the start or first end of a new filled product P to be filled.

The pressure applied by barrel press FP to the filling material is high enough that the filling material flows beyond the end of filling tube F into the tubular casing material, thereby pulling more casing material off filling tube F. At the same time as casing material is drawn off, flat web material B is likewise drawn from the supply VF thereof, then smoothed and kept under tension by deflecting rollers 110, 112, 114 and guided to shaper ring 120, where flat web material B is wrapped around filling tube F to form a tube, in such a way that the longitudinal edges of the material overlap. The size of shaper ring 120 defines the diameter of the tubular casing material.

Also simultaneously with the drawing-off of casing material, the unsealed, overlapping longitudinal edges of flat web material B are sealed by sealing bar 140 which has been lowered onto the overlap, thus producing the section of tubular casing material behind sealing bar 140 in the direction of flow of the filling material.

The sensor 130 located on deflecting roller 112 measures the length of flat web material B being drawn off and supplies a corresponding signal to the controller S. The length of flat web material B rolled off from the supply VF of flat web material B corresponds to the length of tubular casing material due to the arrangement of the filling device according to the invention. By this means, the filled volume is also known when the diameter is known.

After a predetermined length of flat web material B has been drawn from the supply VF thereof, sensor 130 issues a signal directly to the motor M of shutoff valve AV or to the controller S, which issues a corresponding signal to the motor M, which closes shutoff valve AV in response. This stops any further feeding of filling material, and the desired amount of filling material is in the tubular portion of the casing material. Previously known displacer shears (not shown) now grip between the end of filling tube F and the section of casing material that has just been filled, thus forming, in likewise previously known manner, a gathered end or plait that is free of filling material. Onto the latter, a clip placement and clip closing device places and closes a clip C, in response to a corresponding signal from controller S, if necessary, thus closing the section of casing material which has just been filled. The result is a finished filled product P.

The clip placement and clip closing device also places a second clip C to create the starting point for the next filled product P. A severing unit, part of the clip placement and clip closing device, not shown in further detail, severs the filled product P from the rest of the casing material, between clip C of the finished filled product P and clip C forming the end of the next filled product. This operation can likewise be controlled by the controller S.

After the filled product P has been severed, the severing unit and/or the clip placement and clip closing device sends a severed signal to the controller S, indicating completion of the filling operation. After receiving the severed signal, controller S issues a start signal for a filling operation to the motor M of shutoff valve AV. On receiving the start signal, motor M opens shutoff valve AV and the next filling operation begins.

The scope of the invention is not limited to the embodiment shown in FIG. 2 and FIG. 3. For example, a supply VV of tubular casing material may already be stored on filling tube F, with sensor 130 then measuring the length of the tubular casing material drawn from filling tube F. It is also conceivable to use a different sealing device to the proposed sealing device 100. Finally, the shutoff valve AV can also be embodied as a solenoid valve that can then be actuated directly by a controller.

It must also be noted that the invention can be embodied not only in such a way that the separate devices, the shutoff valve and its motor and the sensor are all connected directly to each other and supply each other mutually with control signals, but also in such a way that signalling is done via the controller S. The filling device according to the invention can be embodied not only in a horizontal arrangement, as described above, but also in a vertical arrangement.

Having described the invention, what is claimed is:

1. A filling device for filling viscous filling material into a tubular casing material comprising:
   a shutoff valve through which pressurized filling material flows;
   a pump upstream of the shutoff valve providing pressurized filling material to the shutoff valve;

a filling tube disposed downstream from said shutoff valve in the direction of flow of the filling material;

a clip placement and clip closing device disposed downstream from said filling tube in the direction of flow of the filling material;

a supply of tubular casing material disposed on the filling tube; and at least one sensor measuring the length of casing material drawn from the supply of casing material, an output signal of said at least one sensor for adjusting the volume of filling material product by controlling the opening and closing of the shutoff valve through which the pressurized filling material is fed to the filling tube.

2. The filling device of claim 1, further comprising:
a controller configured to receive the output signal of the at least one sensor and to adjust at least the length of time that the shutoff valve is open.

3. The filling device of claim 2, where
the controller is operably connected to the at least one sensor, the controller being configured to receive the sensor signals.

4. The filling device of claim 2, where
at least one of the controller and the clip placement and clip closing device clip is configured to output a start signal for a filling operation.

5. The filling device of claim 2, where
the controller is operably connected to the clip placement and clip closing device.

6. The filling device of claim 2, where
the clip placement and clip closing device includes a severing unit for severing a filled product after completion of the filling operation.

7. The filling device of claim 6, where
the controller is configured to output a start signal for a filling operation after receiving at least one of a clip placement and clip closing signal and a severed signal from the clip placement and clip closing device.

8. The filling device of claim 1, where
the sensor for measuring the length of casing material drawn from the supply of casing material is disposed in the immediate vicinity of the filling tube.

9. The filling device of claim 1, further comprising:
a supply of flat web material for the casing material; and
a sealing device configured to wrap the flat web material from the supply of flat web material around the filling tube to form a tube and seal said tube in the longitudinal direction.

10. The filling device of claim 9, where
the sensor for measuring the length of the casing material drawn from the supply of casing material is disposed on a deflecting roller in the sealing device and measures the length of the flat web material drawn from the supply of flat web material.

11. The filling device of claim 1, where
pressure from the pressurized filling material draws the casing material from the supply of casing material disposed on the filling tube.

12. The filling device of claim 1, where
the shutoff valve is motor driven.

13. The filling device of claim 12, where
the motor of the motor shutoff valve is connected to a controller.

14. The filling device of claim 1, further comprising:
a filling material pressure device connected to the shutoff valve, the filling material pressure device providing pressurized filling material to the shutoff valve.

15. A method for filling viscous filling material into a tubular casing material, comprising the steps:
providing a supply of tubular casing material disposed on a filling tube;
feeding pressurized, viscous filling material to a shutoff valve,
when the shutoff valve is open, filling the filling material through the shutoff valve the through the filling tube into the tubular casing material,
drawing a further portion of tubular casing material from the supply of tubular casing material,
sensing with a sensor the length of casing material drawn from the supply of tubular casing material, said sensor also generating an output signal for adjusting the volume of filling material product,
controlling the opening and closing of the shutoff valve through which the pressurized filling material is fed to the filling tube based on the length of tubular casing material drawn from the supply of tubular casing material and an output signal from said sensor generating said output signal for adjusting the volume of filling material product,
operating a clip placement and clip closing device disposed downstream from the filling tube in the direction of flow of the filling material placing a clip on the tubular casing material and closing the clip,
the step of feeding pressurized, viscous filling material to the shutoff valve continuing while the shutoff valve is closed.

16. The method of claim 15, further comprising:
providing a controller configured to adjust the length of time that the shutoff valve is open.

17. The method of claim 16, where
the controller processes sensor signals from the sensor.

18. The method of claim 17, further comprising:
outputting a start signal for a filling operation from the controller.

19. The method of claim 16, further comprising:
processing signals from the clip placement and clip closing device with the controller.

20. The method of claim 19, further comprising:
processing signals from a severing unit forming one component of the clip placement and clip closing device with the controller.

21. The method of claim 19, further comprising:
outputting a start signal for a filling operation after receiving at least one of a clip placement and clip closing signal and a sever signal from the clip placement and clip closing device with the controller.

* * * * *